United States Patent
Wang et al.

(10) Patent No.: US 6,635,321 B2
(45) Date of Patent: Oct. 21, 2003

(54) VACUUM IG WINDOW UNIT WITH EDGE SEAL FORMED VIA MICROWAVE CURING, AND CORRESPONDING METHOD OF MAKING THE SAME

(75) Inventors: Yei-Ping Wang, Troy, MI (US); Scott V. Thomsen, Milford, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/222,784

(22) Filed: Aug. 19, 2002

(65) Prior Publication Data

US 2002/0197423 A1 Dec. 26, 2002

Related U.S. Application Data

(62) Division of application No. 09/670,559, filed on Sep. 27, 2000, now Pat. No. 6,478,911.

(51) Int. Cl.⁷ .............................. E06B 3/24; E04C 2/54
(52) U.S. Cl. ...................................... 428/34; 52/786.13
(58) Field of Search .......................... 428/34, 120, 192; 52/786.13; 116/107, 109

(56) References Cited

U.S. PATENT DOCUMENTS

| | | | |
|---|---|---|---|
| 3,919,023 A | * 11/1975 | Bowser et al. | 428/34 |
| 4,683,154 A | 7/1987 | Benson et al. | |
| 4,786,344 A | 11/1988 | Beuther | |
| 4,928,448 A | 5/1990 | Phillip | |
| 5,017,252 A | 5/1991 | Aldrich et al. | |
| 5,270,084 A | 12/1993 | Parker | |
| 5,567,258 A | * 10/1996 | Lee et al. | 156/109 |
| 5,657,607 A | 8/1997 | Collins et al. | |
| 5,664,395 A | 9/1997 | Collins et al. | |
| 5,855,638 A | 1/1999 | Demars | |
| 5,891,536 A | 4/1999 | Collins et al. | |
| 5,897,927 A | 4/1999 | Tsai et al. | |
| 5,902,652 A | 5/1999 | Collins et al. | |
| 6,037,710 A | 3/2000 | Poole et al. | |
| 6,040,564 A | 3/2000 | Ueda et al. | |
| 6,071,575 A | 6/2000 | Collins et al. | |
| 6,109,994 A | 8/2000 | Cho et al. | |
| 6,336,984 B1 | 1/2002 | Aggas | |
| 6,352,749 B1 | 3/2002 | Aggas | |
| 6,365,242 B1 | 4/2002 | Veerasamy | |
| 6,372,312 B1 | 4/2002 | Aggas | |
| 6,383,580 B1 | 5/2002 | Aggas | |
| 2002/0046797 A1 | 4/2002 | Collins | |

FOREIGN PATENT DOCUMENTS

| | | |
|---|---|---|
| DE | 38 24 129 A1 | 1/1989 |
| EP | 0 420 638 A1 | 4/1991 |
| WO | WO 01/23700 | 4/2001 |

OTHER PUBLICATIONS

U.S. Patent Appln Ser. No. 09/670,559 filed Sep. 27, 2000.
Solar Energy vol. 63, No. 4, pp. 243–249, 1998 "Fabrication of Evacuated Glazing at Low Temperature" Griffiths et al.
Solar Energy vol. 62, No. 3, pp. 189–213, 1998 "Current Status of the Science and Technology of Vacuum Glazing" Collins et al.
"Thermal Outgassing of Vacuum Glazing", Lenzen et al., pp. 1–31.
U.S. Patent Appln. Ser. No. 09/303,550 filed May 3, 1999.
U.S. Patent Appln. Ser. No. 09/348,281 filed Jul. 7, 1999.
U.S. Patent Appln. Ser. No. 09/404,659 filed Sep. 24, 1999.

* cited by examiner

*Primary Examiner*—Donald J. Loney
(74) *Attorney, Agent, or Firm*—Nixon & Vanderhye P.C.

(57) ABSTRACT

A vacuum insulating glass (IG) unit and method of manufacturing the same. A peripheral or edge seal of a vacuum IG unit is formed utilizing microwave energy in order to enable tempered glass sheets of the IG unit to retain a significant portion of their original temper strength. In certain exemplary embodiments, the edge seal may be formed of solder glass.

2 Claims, 7 Drawing Sheets

VACUUM IG WINDOW UNIT WITH EDGE SEAL FORMED VIA MICROWAVE CURING, AND CORRESPONDING METHOD OF MAKING THE SAME

RELATED APPLICATIONS

This application is related to commonly owned U.S. Ser. No. 09/303,550, now U.S. Pat. No. 6,326,067, U.S. Ser. No. 09/348,281, now U.S. Pat. No. 6,368,242 and U.S. Ser. No. 09/404,659, now U.S. Pat. No. 6,336,984 all of which are hereby incorporated herein by reference. This application is a divisional of Ser. No. 09/670,559, now U.S. Pat. No. 6,478,911.

This invention relates to a vacuum insulating glass (IG) unit, and a method of making the same.

BACKGROUND OF THE INVENTION

Vacuum IG units are known in the art. For example, see U.S. Pat. Nos. 5,664,395, 5,657,607, and 5,902,652, the disclosures of which are all hereby incorporated herein by reference.

Prior art FIGS. 1–2 illustrate a conventional vacuum IG unit. IG unit 1 includes two spaced apart glass substrates 2 and 3 which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution therebetween. The entire assembly including sheets 2, 3, the spacers, and the seal material is then heated to a temperature of approximately 500° C. at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventor Collins of the '395 patent states in "Thermal Outgassing of Vacuum Glazing", by Lenzen, Turner and Collins, that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

Unfortunately, the aforesaid high temperatures and long heating times utilized in the formulation of edge seal 4 are undesirable, especially when it is desired to use a tempered glass substrate(s) 2, 3 in the vacuum IG unit. As shown in FIGS. 3–4, tempered glass loses temper strength upon exposure to high temperatures as a function of heating time. Moreover, such high processing temperatures may adversely affect certain low-E coating(s) that may be applied to one or both of the glass substrates.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (F). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1–2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength is of course undesirable.

In FIGS. 3–4, it is noted that much better temper strength remains in a thermally tempered sheet when it is heated to a temperature of 800° F. (i.e., about 428° C.) for one hour as opposed to 900° F. for one hour. Such a glass sheet retains about 70% of its original temper strength after one hour at 800° F., which is significantly better than the less than 20% when at 900° F. for the same period of time.

It will be apparent of those of skill, in the art that there exists a need for a vacuum IG unit, and corresponding method of making the same, where a structurally sound hermetic edge seal may be provided between opposing glass sheets without at least certain portions of thermally tempered glass sheet(s)/substrate(s) of the IG unit losing more than about 50% of original temper strength. There also exists a need in the art for a vacuum IG unit including tempered glass sheets, wherein the peripheral seal is formed such that the glass sheets retain more of their original temper strength than with a conventional vacuum IG manufacturing technique where the entire unit is heated in order to form a solder glass edge seal. There also exist a need in the art to decrease post-tempering processing time, and to reduce the long time period(s) now believed necessary to form a solder glass edge seal in a vacuum IG unit. It is a purpose of this invention to fulfill one or more of the above listed needs in the art.

SUMMARY OF THE INVENTION

An object of this invention is to provide a vacuum IG unit having a peripheral or edge seal formed so that at least certain portion(s) of thermally tempered glass substrates/sheets of the IG unit retain more of their original temper strength than if conventional edge seal forming techniques were used with the solder glass edge seal material.

Another object of this invention is to provide a vacuum IG unit, and method of making the same, wherein at least a portion of the resulting thermally tempered glass substrate(s) retain(s) at least about 50% of original temper strength after formation of the edge seal (e.g., solder glass edge seal).

Another object of this invention is to reduce the amount of post-tempering heating time necessary to form a peripheral/edge seal in a vacuum IG unit.

Yet another object of this invention is to form a hermetic edge seal in a vacuum IG unit by utilizing microwave energy to cure edge seal material. In an exemplary embodiment, glass frit suspended in liquid or solution may be deposited as an edge seal material and thereafter heated via microwave energy in order to form the edge seal of a vacuum IG window unit. In other embodiments, microwave energy may also or instead be used to form a seal(s) (e.g., solder glass seal) around a pump out tube of a vacuum IG unit.

The use of microwave energy (localized or otherwise) in order to form an edge seal enables one or both of the thermally tempered glass sheets/substrates to retain much temper strength because at least certain portions (e.g., central portions) of the glass substrate(s) need not be heated along with the solder glass edge seal material during formation of the edge seal. Moreover, the use of microwave energy in forming the edge seal of a vacuum IG unit can result in reduced processing time as well as a reduced need for capital intensive manufacturing equipment such as ovens, furnaces, or the like.

Another object of this invention is to fulfill one or more of the above listed objects and/or needs.

This invention fulfills one or more of the aforesaid needs and/or objects by providing a method of making a seal of a thermally insulating glass panel, the method comprising the steps of:

providing first and second at least partially tempered glass substrates, with a plurality of spacers therebetween;

forming a seal (e.g., peripheral or edges seal) in contact with at least one of the substrates using microwave energy in a manner so that after the seal has been formed at least certain portions of the first and second substrates retain at least about 50% of original temper strength; and evacuating a space between the first and second substrates so as to form a vacuum or low pressure area having a pressure less than atmospheric pressure between the first and second substrates.

Certain embodiments of this invention further fulfill one or more of the aforesaid needs and/or objects by providing a thermally insulating glass unit comprising:

first and second at least partially tempered glass substrates spaced apart from one another via at least a plurality of spacers;

a microwave energy-formed hermetic peripheral or edge seal located at least partially between the first and second substrates, said peripheral or edge seal having been formed in a manner such that at least certain portions of the first and second substrates retain at least about 50% of their original temper strength after formation of the seal; and a space having a pressure less than atmospheric pressure provided between said substrates and sealed off by said microwave energy-formed hermetic peripheral or edge seal.

IN THE DRAWINGS

Figure 5:
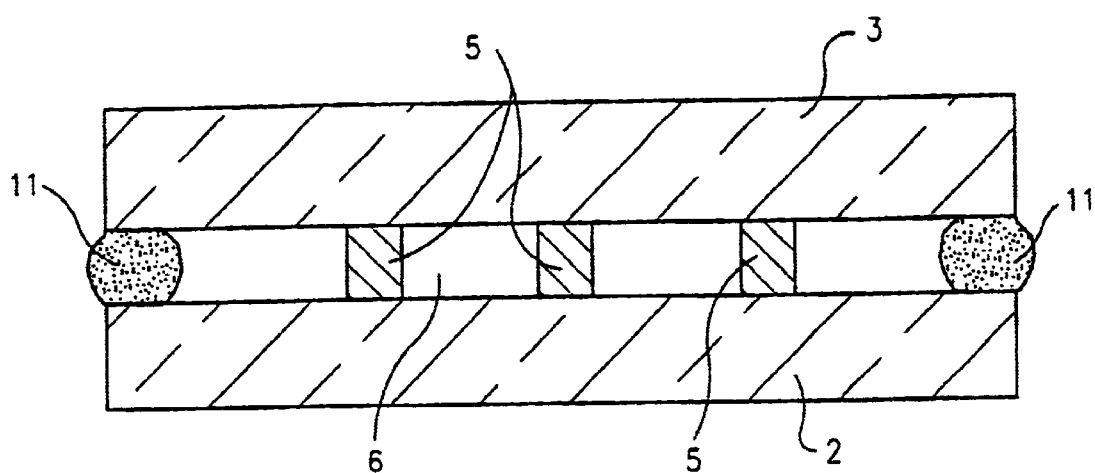
FIG. 5 is a side cross-sectional view of a vacuum IG unit according to an embodiment of this invention.
Figure 6A:
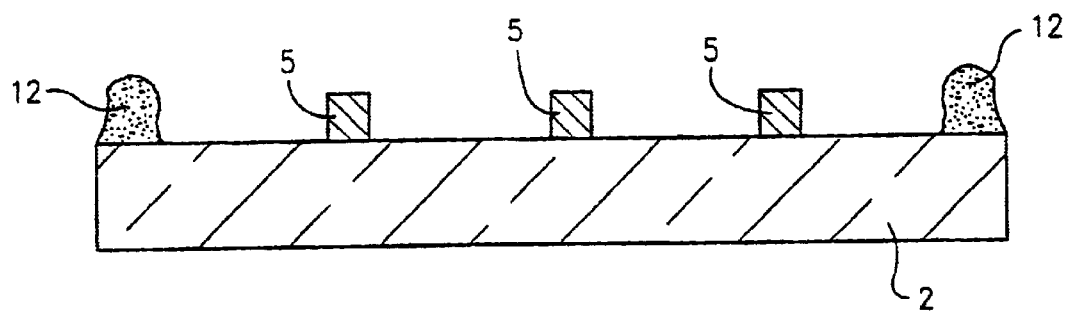
Figure 6B:
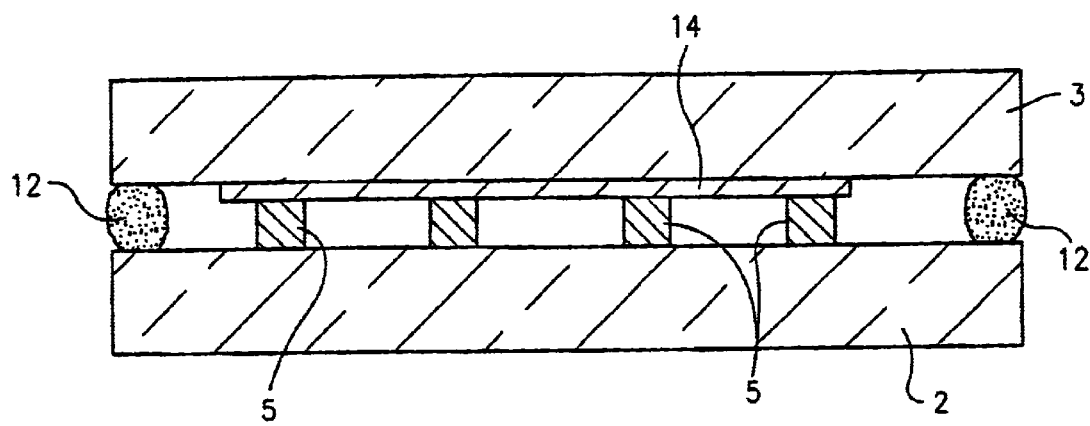
Figure 6C:
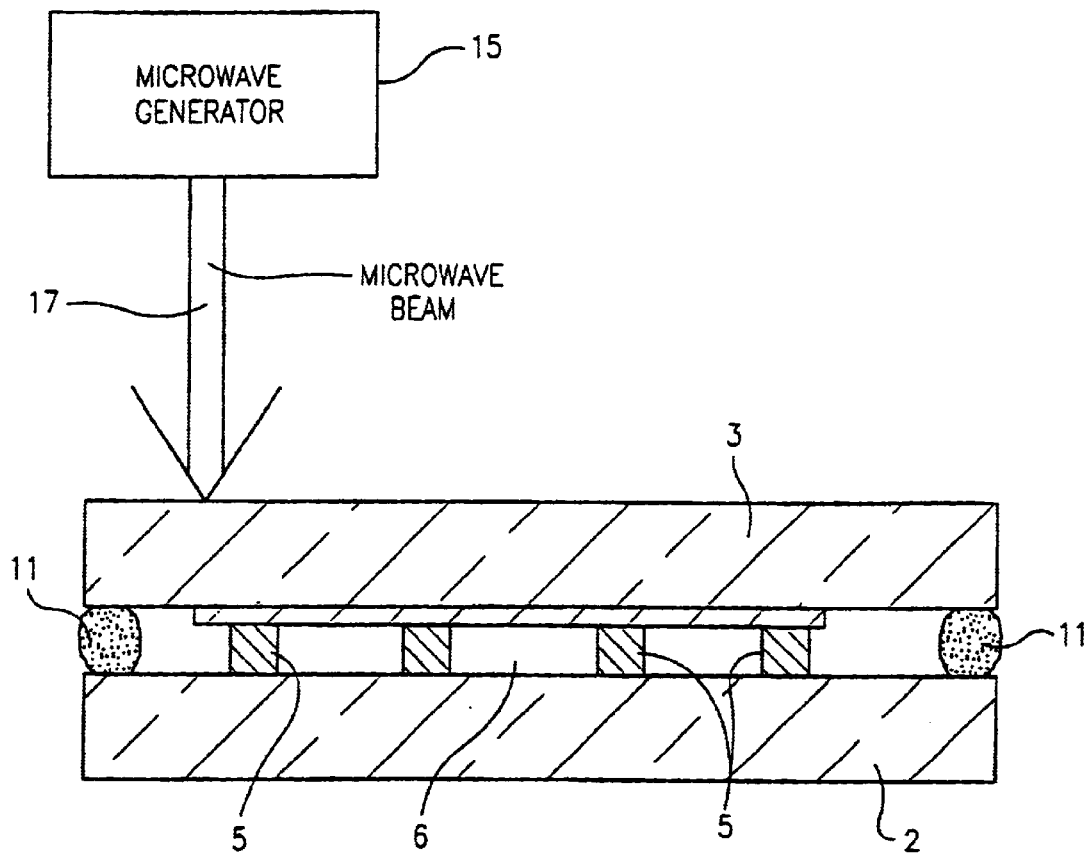

FIGS. 6(a) through 6(c) illustrate certain manufacturing steps performed during the manufacture of the vacuum IG unit of FIG. 5 according to an embodiment of this invention.

Figure 7:
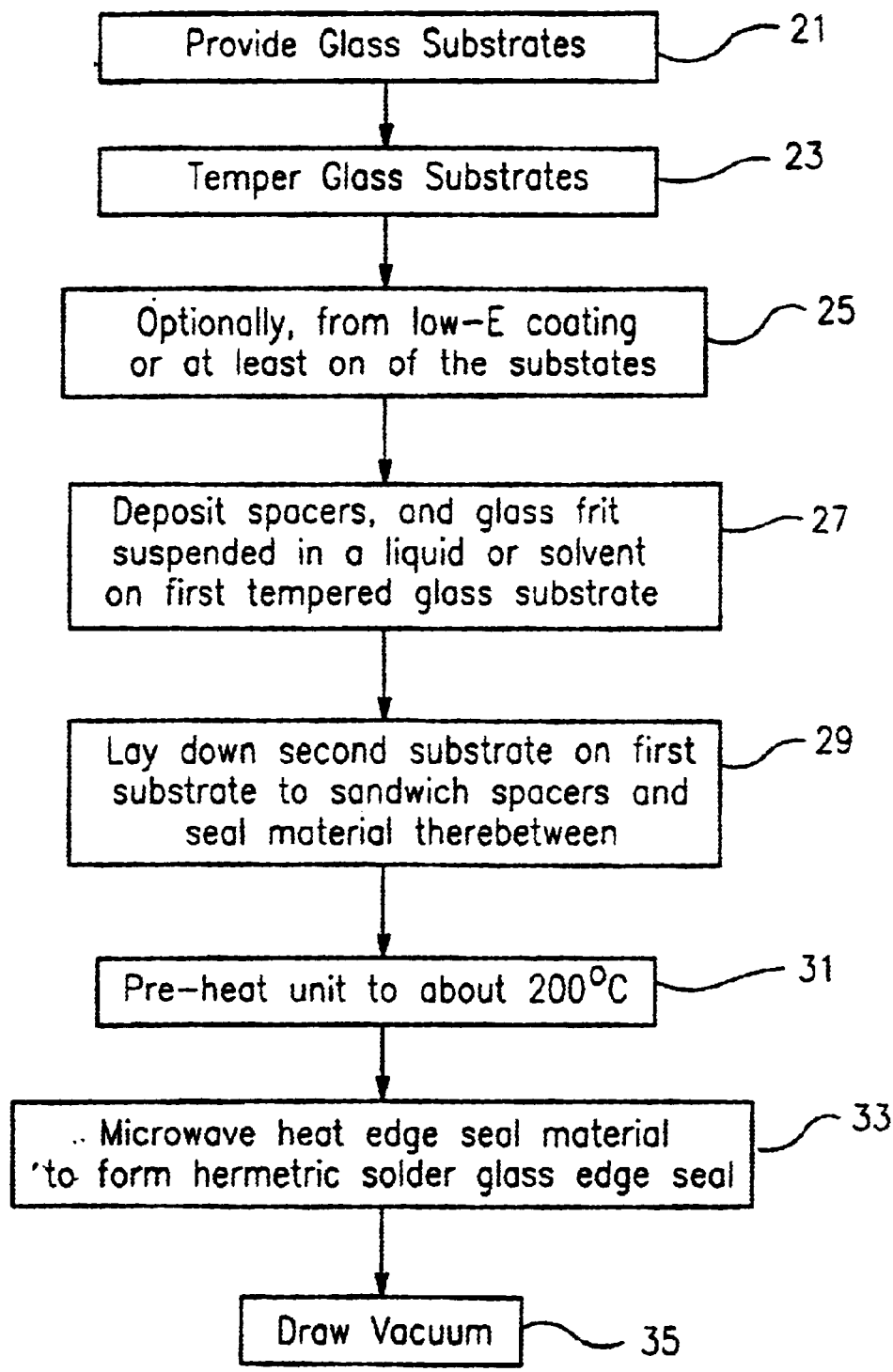

FIG. 7 is a flow chart illustrating certain steps performed according to an embodiment of this invention in forming a vacuum IG window unit.

Figure 8:
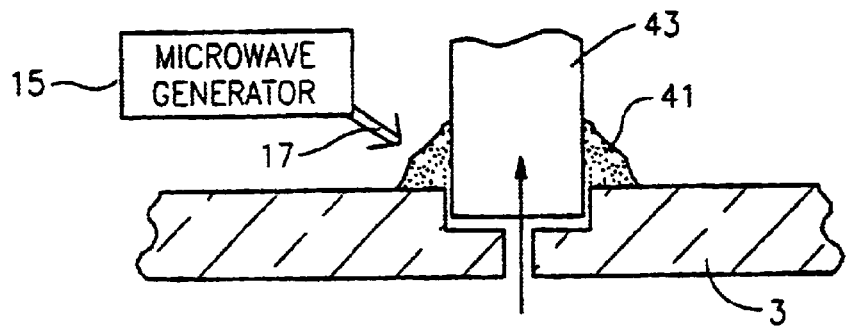

FIG. 8 is a cross sectional view of a portion of a vacuum IG window unit illustrating that a seal around a pump-out tube may be formed using microwave energy according to an embodiment of this invention.

Figure 9:
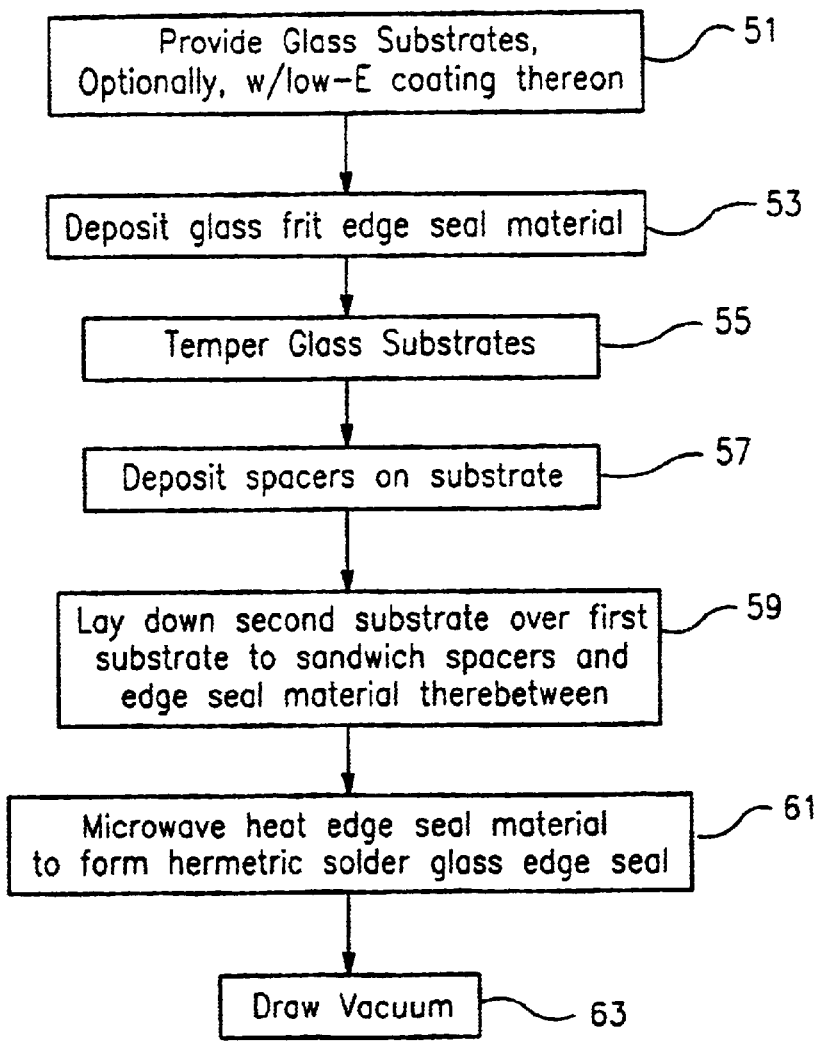

FIG. 9 is a flowchart illustrating certain steps taken in accordance with yet another embodiment of this invention.

DETAILED DESCRIPTION OF CERTAIN EMBODIMENTS OF THIS INVENTION

Referring now more particularly to the accompanying drawings in which like reference numerals indicate like parts throughout the several views.

Certain embodiments of this invention relate to an improved peripheral or edge seal in a vacuum IG window unit, and/or a method of making the same. "Peripheral" and "edge" seals herein do not mean that the seals are located at the absolute periphery or edge of the unit, but instead mean that the seal is at least partially located at or near (e.g., within about two inches) an edge of at least one substrate of the unit.

Certain embodiments of this invention utilize microwave energy during the formation of an edge or other seal for a vacuum IG unit. In an exemplary embodiment, microwave energy may be used in order to cure edge seal material into a resulting edge seal (e.g., solder glass inclusive edge seal) in a vacuum IG unit. As will be explained more fully below, the use of microwave energy may enable at least portion(s) of one or more of the thermally tempered glass substrate(s) 2, 3 to retain more temper strength than they otherwise would during a conventional formation of a solder glass edge seal in a vacuum IG unit. Additionally, the use of microwave energy may reduce the likelihood of damage to an optional low-E coating(s) provided on one or more of the glass substrates. Still further, the use of microwave energy during formation of a solder glass edge seal may enable processing time to be reduced relative to conventional solder glass edge seal curing times. Thus, while tempered substrates 2, 3 are preferred, they are not necessary and non-tempered substrates 2, 3 may instead be used in certain alternative embodiments of this invention.

FIG. 5 is a cross-sectional view of a thermally insulating glass panel according to an embodiment of this invention. Because interior space or cavity 6 between the opposing substrates is at a pressure lower than atmospheric in general, this type of panel is often referred to as a vacuum insulating glass (IG) unit having low pressure space 6.

Figure 2:
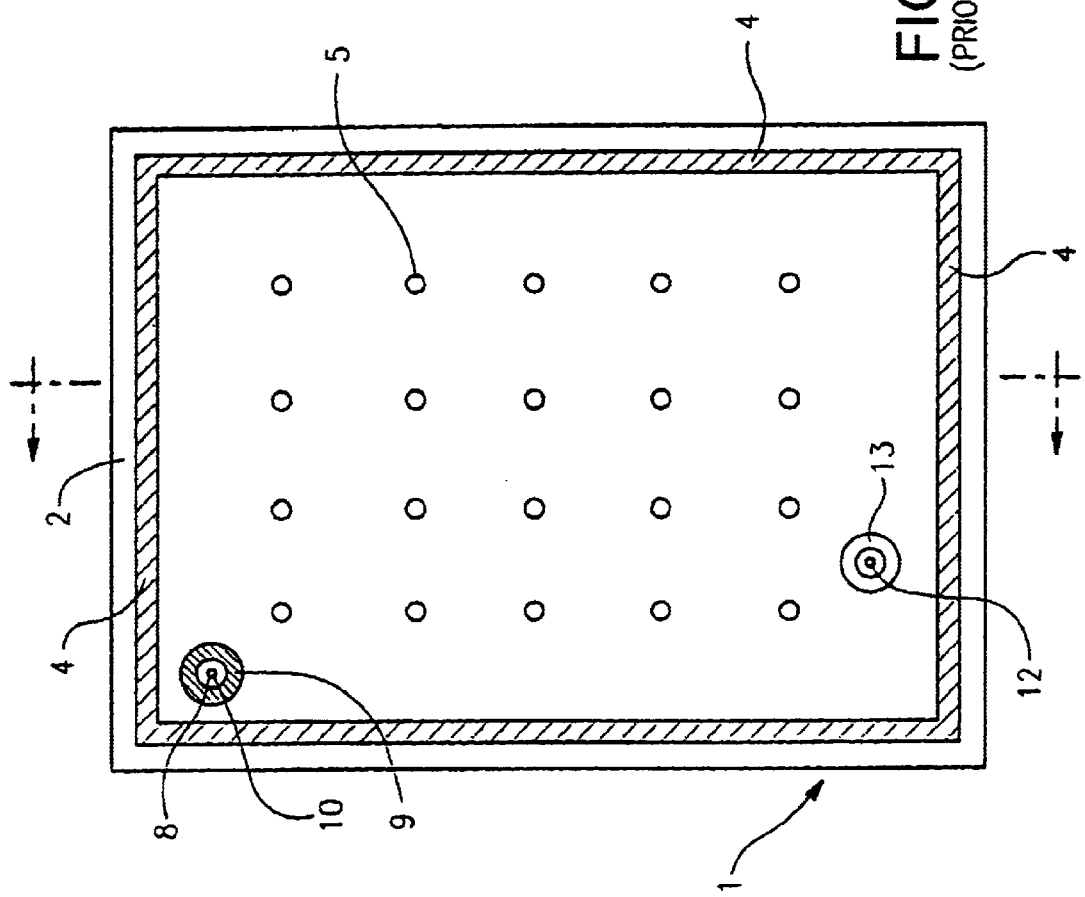
FIG. 2 is a prior art top plan view of the bottom substrate, edge seal, and spacers of the FIG. 1 vacuum IG unit taken along the section line illustrated in FIG. 1.
Figure 1:
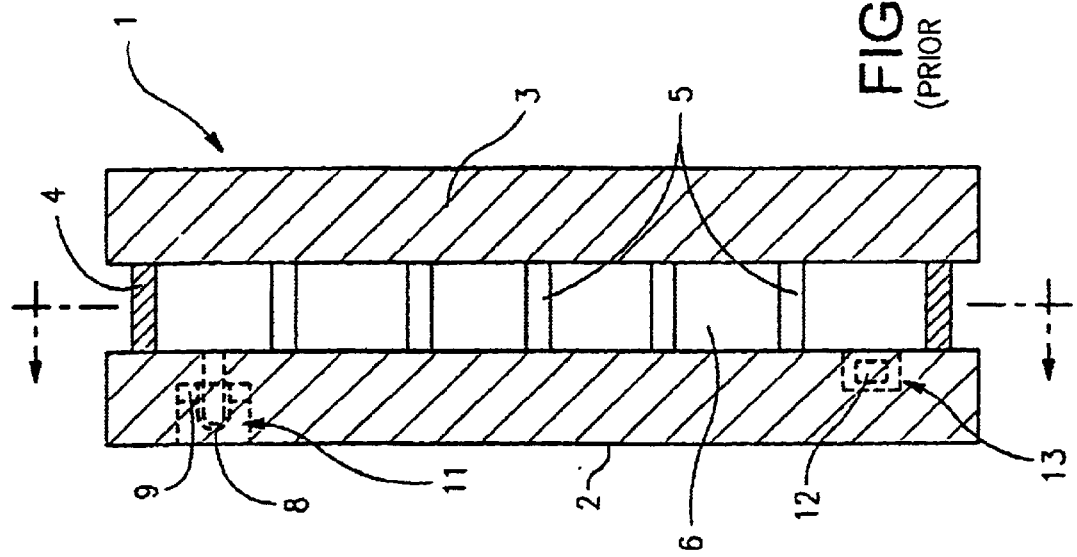
FIG. 1 is a prior art cross-sectional view of a conventional vacuum IG unit.
Figure 3:
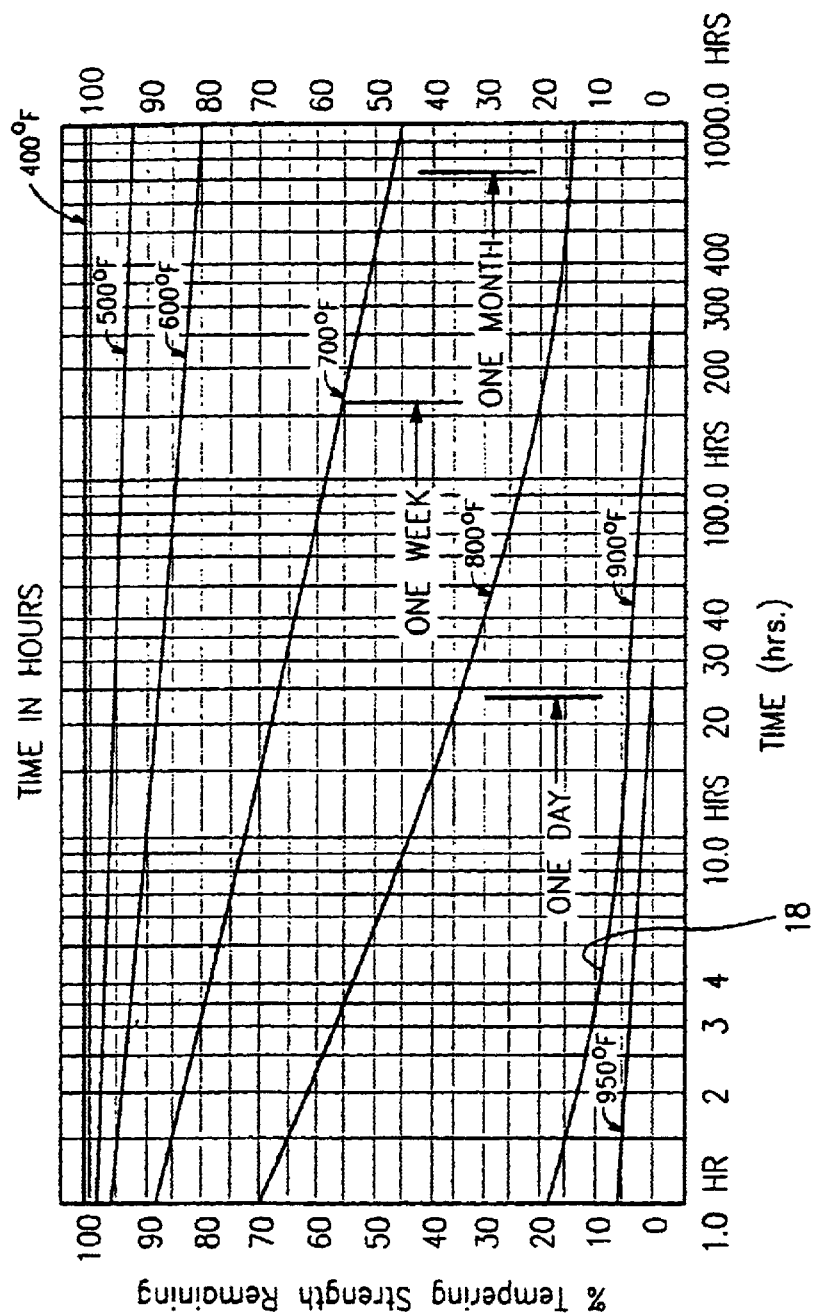
FIG. 3 is a graph correlating time (hours) versus percent tempering strength remaining, illustrating the loss of original temper strength for a thermally tempered sheet of glass after exposure to different temperatures for different periods of time.
Figure 4:
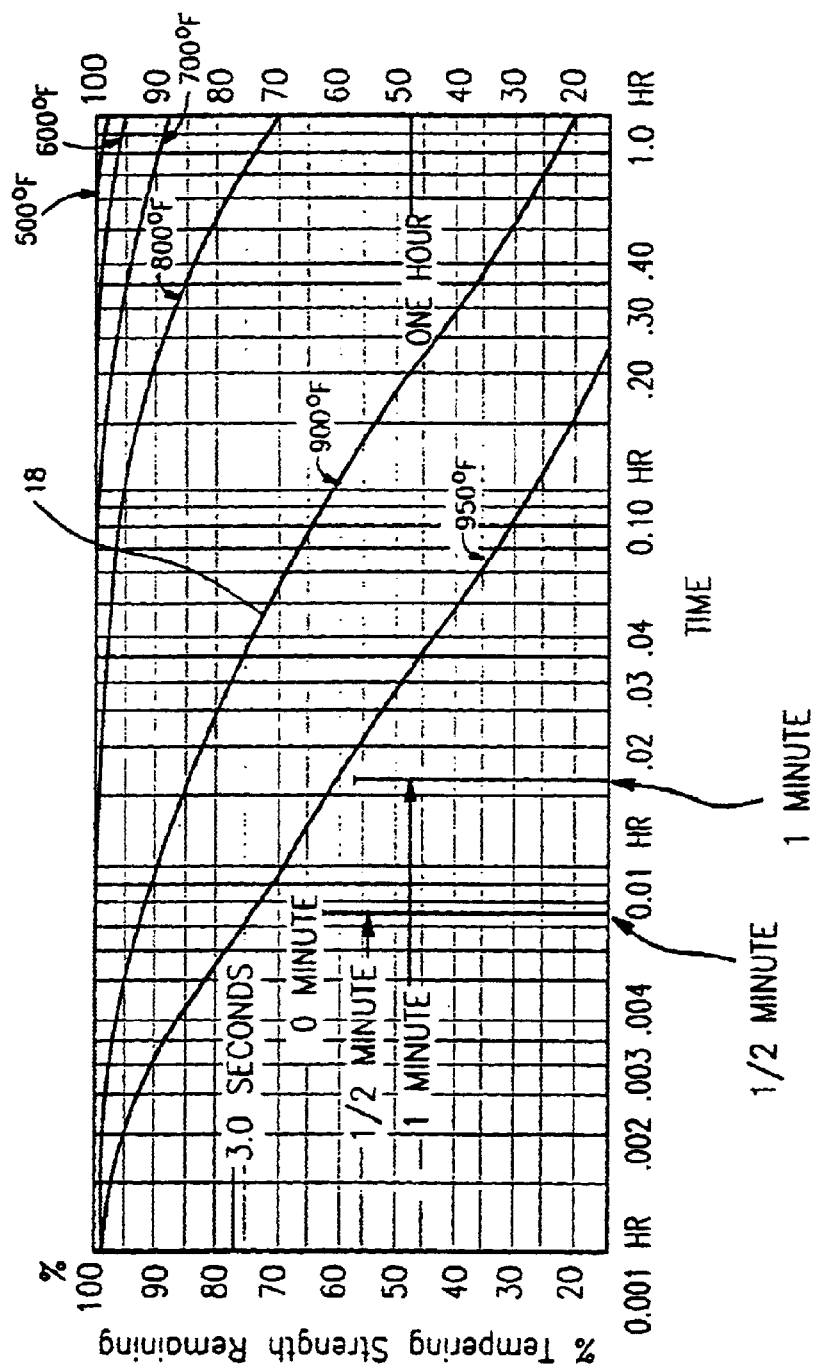
FIG. 4 is a graph correlating time versus percent tempering strength remaining similar to that of FIG. 3 except that a smaller time period is provided on the x-axis.

The vacuum IG unit or panel of FIG. 5 includes first glass substrate 2, second glass substrate 3, low pressure or evacuated space 6 provided between substrates 2 and 3, spacers/ pillars 5 for spacing the substrates 2, 3 from one another and supporting them, optional pump out tube (not shown) disposed in a hole or aperture formed in one of the substrates for evacuating space 6, and peripheral or edge seal 11 that hermetically seals low pressure space 6 between substrates 2, 3. Hermetic edge seal 11 prevents air from entering space 6 and keeps the vacuum therein. Seal 11 in certain embodiments of this invention may be located in approximately the same location as edge seal 4 shown in FIG. 2. Any other suitable location is possible so long as a low pressure space 6 is sealed off between the substrates. Substrates 2, 3 are preferably thermally tempered glass.

In certain embodiments of this invention, glass substrates 2, 3 may be approximately the same size. However, in other embodiments of this invention, one glass substrate 2 may be larger in size than the other glass substrate 3 in order to provide an approximately L-shaped step proximate an edge of the vacuum IG unit.

Vacuum IG units according to different embodiments of this invention may be used as residential or commercial windows. The evacuation of space 6 eliminates or reduces heat transport between glass substrates 2, 3 due to gaseous conduction and convection. In addition, radiative heat transport between glass sheets/substrates 2 and 3 can be reduced to a low level by providing an optional low emissivity (low-E) coating(s) on the internal surface of one or both substrates 2, 3. High levels of thermal insulation can thus be achieved. In certain embodiments, the pressure in space 6 is reduced to a level below about $10^{-2}$ Torr, more preferably below about 1.0 mTorr, or $10^{-3}$ Torr, and most preferably below about $10^{-4}$ Torr of atmospheric pressure. To maintain such pressures, the internal surfaces of glass substrates 2, 3 may be outgassed, and areas at or near the edges or peripheries of substrates 2, 3 hermetically sealed together by seal 11 in order to eliminate any ingress of gas or air.

As shown in FIG. 5, an array of small, high strength support spacers or pillars 5 is provided between substrates 2 and 3 in order to maintain separation of the approximately parallel glass substrates against atmospheric pressure. It is often desirable for spacers 5 to be sufficiently small so that they are visibly unobtrusive. In certain embodiments, each pillar or spacer 5 may have a height of from about 0.20 to 1.0 mm, more preferably from about 0.20 to 0.40 mm. Spacers 5 may be made of solder glass, ceramic, metal, or any other suitable material in different embodiments of this invention.

Tempered glass sheets 2 and 3 are preferred for their mechanical and thermal strength. Tempered glass has been used traditionally in commercial applications where wind, snow or thermal loads exceed the strength capabilities of other glass and/or where tempered glass is mandated by code (e.g., safety glazings for entranceways, railings, or fire knock-out windows). In certain preferred embodiments of this invention, glass substrates 2 and/or 3 are thermally or heat tempered. By providing tempered glass substrates 2 and 3, the strength of the glass is increased. This may enable pillars to be spaced further apart, which increases stresses at the glass/pillar interface(s) but may potentially result in less pillars being utilized in the vacuum IG unit. Reduction in a number of pillars may enhance the thermal insulation properties of the vacuum IG unit and/or improve aesthetic characteristics of the unit. In preferred embodiments of this invention, the glass sheets are thermally tempered prior to their sandwiching of the spacers therebetween.

According to certain embodiments of this invention, the glass used for substrates 2 and 3 is soda lime silica glass. However, other types of glass, colored or clear, may also be used (e.g., borosilicate glass). Glass substrates 2 and/or 3 may be from about 2 to 6 mm thick in certain embodiments, preferably from about 3–5 mm thick each. However, when tempered, thinner glass sheets 2, 3 may be used (e.g., from about 2.5 to 4.0 mm thick).

According to preferred embodiments of this invention, solder glass edge seal 11 is formed at a location at least partially between substrates 2 and 3 through the use of microwave energy. The microwave energy is directed toward the edge seal material in order to cure the same into the resulting solder glass edge seal 11. In certain embodiments of this invention, the microwave energy may be directed toward localized areas of the vacuum IG unit where the edge seal is to be formed in order to avoid substantially heating central areas of the glass substrates 2, 3 so that at least certain portions (e.g., central portions) of the glass substrates can retain much of their original temper strength. In other embodiments of this invention, microwave energy sensitive additives or dopants may be provided in the edge seal material so that the edge seal material absorbs more microwave energy than do glass sheets 2, 3. Again, it is possible to heat the edge seal material and form hermetic solder edge seal 11 while at the same time enabling large portions of glass sheets 2, 3 (and potentially the entire substrates 2, 3) to retain much of their original temper strength.

FIGS. 6(*a*)–6(*c*) are side cross-sectional views illustrating steps taken during the manufacture of an exemplary vacuum IG unit according to a particular embodiment of this invention. Initially, first and second glass substrates 2, 3 are provided. At least one of the substrates is preferably thermally tempered, and both may be tempered in certain embodiments. As shown in FIG. 6(*a*), a plurality of spacers 5 and edge seal material 12 are deposited on a major surface of tempered glass substrate 2. Spacers 5 may be deposited before edge seal material 12, or vice versa.

According to an exemplary embodiment, glass frit suspended in a liquid or solvent is deposited around an edge of substrate 2 as edge seal material 12. The frit is known in the art as a particulate-like substance (e.g., pulverized, ground, or and/powdered glass). An exemplary solvent in which the glass frit may be suspended in edge seal material 12 is amyl acetate. Optionally, a binder such as methyl cellulose or nitrocellulose may be added to the solvent. Thus, according to one exemplary embodiment, the solder glass or edge seal material 12 deposited proximate the periphery of the major interior surface of substrate 2 may include about 90% glass frit powder, and 10% solution. In certain embodiments, material 12 may include from about 70–99% glass frit powder, and from about 1–30% solution. The solution may include, for example, 98.8% amyl acetate and 1.2% nitrocellulose (by weight). Other suitable solutions and/or ratios may of course be utilized instead, as the aforesaid materials and ratios are for purposes of example only. For example, frit power Ferro 4000 and binder/solvent F1016AJ (e.g., mixture of 85% Ferro 4000 and 15% by weight F1016AJ) may be used for the edge seal material to be deposited, and the same may be deposited on one of substrates 2, 3 via a syringe or any other suitable dispenser.

After the spacers 5 and edge seal material 12 have been provided on the surface of substrate 2, the other substrate 3 is brought down on top of spacers 5 and edge seal material 12 as shown in FIG. 6(*b*). At this point, primarily spacers 5 function to support substrate 3 above substrate 2. Optionally, a low-E coating or coating system 14 may be provided on an interior surface of substrate 3. Exemplary low-E coating systems 14 which may be used are disclosed in U.S. Pat. Nos. 5,557,462, 5,514,476, 5,425,861, and 5,800,933, the disclosures of which are all hereby incorporated herein by reference.

As shown in FIG. 6(c), microwave energy 17 is then directed toward the edge seal material 12 (e.g., through substrate 2 and/or 3) in order to heat and cure the same in order to form the resulting hermetic peripheral/edge seal 11. In this regard, the glass frit in edge seal material 12 is heated, melted and/or fused by the microwave energy which it absorbs and the solvent is driven off in order to form peripheral/edge seal 11 of solder glass which bonds to substrates 2, 3. Optionally, at least one dopant material(s) may be added to the edge seal material 12 in order to render the edge seal material more absorptive of the microwave energy (e.g., more absorptive of the microwave energy than the substrates 2, 3). For example, a dopant such as silicon carbide may be added to the edge seal material 12 in order to increase its microwave absorption relative to that of glass sheets 2, 3. While silicon carbide is a preferred dopant for increasing the microwave absorption of seal material 12, other suitable dopants (e.g., metals such as Al, Cu, Mg, alloys thereof, etc.) may instead be added to edge seal material 12 to increase its microwave absorption. In certain preferred embodiments, the dopant may represent from about 0–15% by weight of the edge seal material, more preferably from about 2–10%, and most preferably from about 5–8%.

As shown in FIG. 6(c), a localized beam 17 of microwave energy from microwave generator 15 may be directed only toward the area of the vacuum IG unit where hermetic peripheral/edge seal 11 is to be formed. In other words, microwave energy need not be directed toward a central area of the vacuum IG unit near the center or primary viewing area(s) of glass sheets 2, 3. In such a manner, microwave heating of the central portions of the vacuum IG unit can be avoided so that at least central portions of glass substrates 2, 3 can retain at least about 50% (and preferably more) of their original temper strength after the edge seal 11 has been formed. Microwave generator 15 may be robotically controlled to traverse the entire periphery and/or edge of the vacuum IG unit while directing beam 17 only at the area along the edge of the unit where seal 11 is to be formed thereby avoiding the direction of microwave energy toward and/or into central portions of the substrates 2, 3. Beam 17 may be in the form of a point-shaped beam for directing energy only at a specific point of the unit, or alternatively the beam 17 may be a linearly shaped beam so as to direct microwave energy at an area shaped in a linear and elongated manner (e.g., along a partial or entire edge of the unit).

Alternatively, instead of directing the microwave energy toward the vacuum IG unit in the form of a beam 17, the entire vacuum IG unit including the entireties of both substrates 2, 3, and seal material 12 may be passed through a microwave oven for the purpose of heating and forming hermetic edge seal 11. In such embodiments, at least one dopant (e.g., silicon carbide) is preferably added to the edge seal material 12 so as to render it more absorbing of microwave energy than glass substrates 2, 3. In such a manner, while the edge seal material 12 absorbs much microwave energy and fuses so as to form hermetic solder glass edge seal 11, substrates 2 and 3 do not absorb nearly as much microwave energy and are not heated as much as the edge seal material. This, for example, enables the substrates to be capable of retaining at least 50% (and preferably more) of their original temper strength.

While fused solder glass is a preferred material of edge seal 11 according to certain embodiments of this invention, other materials capable of forming a hermetic edge seal may instead be used. For example, hermetic edge seal 11 may be formed of indium, epoxy, or other suitable material in alternative embodiments of this invention (these materials also being exposed to the microwave energy in order to cure the same to form seal 11).

In preferred embodiments of this invention, the microwave energy 17 utilized to form hermetic edge seal 11 has a wavelength of from about 1–10 mm, more preferably from about 2–8 mm, and most preferably from about 2–5 mm. Wavelengths much higher than these are not easily absorbed by glass but could be utilized if sufficient dopant was provided in the edge seal material 12. Thus, while the aforesaid microwave wavelengths are preferred, they are not intended to be limiting unless specifically recited in the claims.

In an exemplary embodiment of this invention, microwave generator 15 may be a Gyrotron Beam Generator which may be obtained by Gyrotron Technologies, Inc., Bristol, Pa. However, as will be recognized by those of skill in the art, other suitable microwave generators may instead by used (e.g., directional beam microwave generators, oven type microwave generators, etc.).

As discussed above, a primary purpose of certain embodiments of this invention is to utilize microwave energy 17 which (i) heats edge seal material 12 in order to form hermetic peripheral/edge seal 11, while (ii) not substantially heating certain portions (e.g., central portions) of the glass substrate(s) 2, 3 so as to not adversely affect the temper strength of substrates 2 and 3 to any significant degree. Thus, at least certain portions of substrates 2 and 3 (and potentially the entire substrates) preferably retain at least about 50% of their original temper strength after hermetic edge seal 11 has been formed, more preferably at least about 60% of their original temper strength, even more preferably at least about 70% of their original temper strength, and most preferably at least about 80% of their original temper strength. This may be achieved by directing the microwave energy 17 in a localized manner only at the area (e.g., near a periphery) of the vacuum IG unit where the edge seal 11 is to be formed so as to prevent or reduce the likelihood of central portions of glass substrates 2, 3 absorbing significant microwave energy. Alternatively, this may be achieved by using an edge seal material 12 (e.g., glass frit in a solvent with dopant) which tends to absorb significantly more microwave energy than do substrates 2, 3. In any event, hermetic edge seal 11 is formed without significant deterioration of the temper strength of at least certain portions (e.g., central portions) of the glass substrates 2, 3.

In certain embodiments of this invention, each area of edge seal material 12 is heated with microwave energy for a limited period of time in order to form hermetic seal 11. For example, in one embodiment each area of edge seal material 12 may be heated with microwave energy for a time of from about 1–60 seconds, more preferably from about 1–30 seconds. However, depending upon the edge seal material being used, the exposure time may vary and may last for minutes in other embodiments. However, it is noted that when appropriate edge seal materials are utilized, the processing time for forming hermetic edge seal 11 can be reduced relative to that of the prior art.

FIG. 7 is a flow chart illustrating certain steps taken in the manufacture of a vacuum IG unit of FIGS. 5–6 according to an exemplary embodiment of this invention. Initially, the glass substrates 2, 3 are provided (step 21). The glass substrates 2, 3 are preferably thermally tempered (step 23).

Optionally, a low-E coating or coating system 14 may be provided on at least one of the substrates 2, 3 (step 25). Spacers 5 and edge seal material 12 (e.g., glass frit suspended in liquid or solvent) is deposited around an edge or periphery of a major surface of the first substrate 2 (step 27) (e.g., see the location of seal 4 in FIG. 2). The glass with frit on it may optionally be heated at this point to about 120 degrees C. for about 15 minutes to evaporate the solvent of the deposited seal material. The second substrate 3 is then brought down over the first substrate so as to sandwich the spacers 5 and seal material 12 therebetween (step 29), with a pressure of e.g., about 0.15 psi all around or everywhere. Optionally, the unit including the substrates 2, 3, spacers 5, and edge seal material 12 may be pre-heated to a temperature of from about 100–250° C., more preferably about 200° C. for about 60 minutes, in order to prevent thermal shock in the glass during the subsequent microwaving step (step 31). Also, step 31 may function to help the seal material fuse with the glass substrates by heating the substrates, and/or may enable binder to burn off for hermeticity purposes. Optionally, the oven temperature may be raised to about 430 degrees C. at this point, letting the stack remain at that temperature for about 60 minutes. The edge seal material 12 may be heated via microwave energy as discussed above in order to form hermetic peripheral/edge seal 11 (step 33). The oven cooling rate may then be set to about 2.8 degrees C. per minute to allow the stack to cool, while lowering the oven temperature to about 310 degrees C. and letting it at that temperature for about 30 minutes during the cooling process. The stack may then be permitted to cool at room temperature at its own rate, roughly 2 degrees C. per minute. Thereafter, a vacuum is drawn (e.g., via a pump out tube located at any suitable position on the unit) in order to form low pressure space or cavity 6 between the substrates (step 35).

FIG. 8 is a cross sectional view illustrating that a solder glass seal 41 around a hollow pump-out tube 43 may also be formed using microwave energy 17 from a microwave generator 15 as described above. This embodiment is the same as the embodiment of FIGS. 1–7, except that the seal material heated with the microwave energy is a seal material provided around at least a portion of a pump-out tube 43. After formation of the hermetic seal 41, the central cavity between the glass substrates 2, 3 may be evacuated by drawing a vacuum out of the cavity via tube 43 as shown in FIG. 8 so as to create low pressure space 6. The formation of a pump-out tube seal 41 using microwave energy may be done either in combination with or separately from formation of an edge seal using microwave energy in different embodiments of this invention.

FIG. 9 is a flowchart illustrating steps that may be taken according to yet another embodiment of this invention. The FIG. 9 embodiment is similar to the FIG. 7 embodiment, with a few notable exceptions. For example, substrate(s) 2, 3 are originally provided in the FIG. 9 embodiment with a low-E coating thereon (step 51). The edge seal material 12 is then deposited around an edge portion of one of the substrates prior to tempering (step 53). Thereafter, one or both of the substrates is/are tempered along with the edge seal material thereon (step 55). During the tempering step, the edge seal material is caused to fuse with the glass substrate upon which it is provided. Then, spacers 5 are deposited on one of the substrates 2, 3 (step 57). The two substrates 2, 3 are brought together with spacers 5 therebetween (step 59). Unlike the FIG. 7 embodiment, at this point the edge seal material may be in a hardened state. Thereafter, microwave energy described above is used to heat the edge seal material in order to melt at least a portion of the same in order to for the hermetic edge seal (step 61). As mentioned above, a hermetic seal around the pump-out tube may optionally be formed using microwave energy as well. Thereafter, a the space between the substrates 2, 3 is evacuated so as to form low pressure space 6 (step 63).

Once given the above disclosure, many other features, modifications, and improvements will become apparent to the skilled artisan. Such other features, modifications, and improvements are therefore considered to be a part of this invention, the scope of which is to be determined by the following claims.

What is claimed is:

1. A thermally insulating glass unit comprising:

first and second at least partially tempered glass substrates spaced apart from one another via at least a plurality of spacers;

a microwave energy-formed hermetic peripheral or edge seal located at least partially between the first and second substrates, said peripheral or edge seal having been formed in a manner such that at least certain portions of the first and second substrates retain at least about 50% of their original temper strength after formation of the seal; and a space having a pressure less than atmospheric pressure provided between said substrates and sealed off by said microwave energy-formed hermetic peripheral or edge seal.

2. The unit of claim 1, wherein said microwave energy-formed hermetic peripheral or edge seal comprises a solder glass inclusive peripheral or edge seal.

* * * * *